United States Patent
Kajio et al.

(10) Patent No.: US 9,771,123 B2
(45) Date of Patent: Sep. 26, 2017

(54) REAR WHEEL SUSPENSION DEVICE MOUNTING STRUCTURE OF MOTORCYCLE FRAME STRUCTURE

(71) Applicant: Kawasaki Jukogyo Kabushiki Kaisha, Kobe-shi, Hyogo (JP)

(72) Inventors: Ryuji Kajio, Akashi (JP); Takeshi Kashihara, Rayong (TH); Krissana Niamsang, Rayong (TH); Sukda Sompun, Rayong (TH); Koichi Umehara, Akashi (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 15/222,165

(22) Filed: Jul. 28, 2016

(65) Prior Publication Data
US 2017/0036730 A1    Feb. 9, 2017

(30) Foreign Application Priority Data
Aug. 6, 2015 (JP) .................... 2015-156076

(51) Int. Cl.
*B62K 25/28* (2006.01)
*B62K 11/06* (2006.01)

(52) U.S. Cl.
CPC ............ *B62K 25/283* (2013.01); *B62K 11/06* (2013.01)

(58) Field of Classification Search
CPC ........ B62K 11/06; B62K 11/08; B62K 25/28; B62K 25/283
See application file for complete search history.

(56) References Cited

U.S. PATENT DOCUMENTS

| 7,438,149 | B2 * | 10/2008 | Ishida | B62K 25/20 180/227 |
| 7,644,795 | B2 | 1/2010 | Kawamura et al. | |
| 9,493,207 | B2 * | 11/2016 | Kawai | B62K 25/04 |
| 2006/0283650 | A1 | 12/2006 | Kawamura et al. | |

FOREIGN PATENT DOCUMENTS

JP    2006-347450    12/2006

\* cited by examiner

*Primary Examiner* — Kevin Hurley (57) ABSTRACT

This rear wheel suspension device of a motorcycle is disposed so as to be displaced to one lateral side relative to a center portion in the vehicle widthwise direction of the motorcycle. A main frame which forms the front half of a motorcycle frame structure has a single backbone frame extending from a head pipe rearward and obliquely downward in the center portion in the vehicle widthwise direction. A vehicle-body-side support member which extends in the vehicle widthwise direction is supported by a rear portion of the backbone frame. A one end portion of the rear wheel suspension device is rotatably supported by a right end portion of the vehicle-body-side support member.

7 Claims, 6 Drawing Sheets

REAR WHEEL SUSPENSION DEVICE MOUNTING STRUCTURE OF MOTORCYCLE FRAME STRUCTURE

CROSS REFERENCE TO THE RELATED APPLICATION

This application is based on and claims Convention priority to Japanese patent application No. 2015-156076, filed Aug. 6, 2015, the entire disclosure of which is herein incorporated by reference as a part of this application.

BACKGROUND OF THE INVENTION (Field of the Invention)

The present invention relates to a mounting structure for a single-shock-type rear wheel suspension device disposed so as to be displaced to one lateral side relative to a center portion in the vehicle widthwise direction of a motorcycle.

(Description of Related Art)

A motorcycle has been known in which a single-shock-type rear wheel suspension device, which couples the rear wheel to the vehicle body, is disposed so as to be displaced to one lateral side relative to a center portion in the vehicle widthwise direction (for example, Japanese Laid-Open Patent Publication No. 2006-347450). The rear wheel suspension device has one end portion coupled to a motorcycle frame structure and the other end portion coupled to a swingarm, whereby shock received from a road surface by the rear wheel is absorbed. When the rear wheel suspension device is disposed so as to be displaced to one lateral side of the vehicle body as disclosed in Japanese Laid-Open Patent Publication No. 2006-347450, mounting and maintenance of the rear wheel suspension device are facilitated, while a unique appearance can be obtained.

In Japanese Laid-Open Patent Publication No. 2006-347450, a U-shaped bracket, which is open to the rear, is fixed by welding to the main frame which forms the front half of a motorcycle frame structure, and via this bracket, a rear wheel suspension device is mounted to the motorcycle frame structure. In the space between a pair of arms of the U-shaped bracket which space is open to the rear, one end portion of the rear wheel suspension device is interposed and supported by means of a fastening member. The fastening member is inserted through the arms and that one end portion thereby to support the one end portion in the simple support manner or at both sides of the one end portion. For the necessity of firmly supporting the rear wheel suspension device, it is difficult to provide the U-shaped bracket at a position distanced from the main frame. Thus, the degree of freedom in offset of the rear wheel suspension device to a lateral side of the vehicle body is limited.

SUMMARY OF THE INVENTION

An object of the present invention is to provide a rear wheel suspension device mounting structure of a motorcycle frame structure, which can improve the degree of freedom in offset of the rear wheel suspension device.

In order to achieve the above object, in a rear wheel suspension device mounting structure of a motorcycle frame structure of the present invention, a rear wheel suspension device of a motorcycle is disposed so as to be displaced to one lateral side relative to a center portion in a vehicle widthwise direction of the motorcycle, and the rear wheel suspension device mounting structure includes a vehicle-body-side support member provided in the motorcycle frame structure and extending in the vehicle widthwise direction, in which case one end portion of the rear wheel suspension device is rotatably supported by one end portion of the vehicle-body-side support member.

According to this configuration, since the rear wheel suspension device is disposed so as to be displaced to one lateral side of the vehicle body, mounting and maintenance of the rear wheel suspension device are facilitated, and in addition, a unique appearance can be obtained. The vehicle-body-side support member which extends in the vehicle widthwise direction is provided to the motorcycle frame structure, and the one end portion of the rear wheel suspension device is rotatably supported by the one end portion of the vehicle-body-side support member. That is, the rear wheel suspension device is supported in a cantilever manner by one end of the vehicle-body-side support member which extends in the vehicle widthwise direction. Accordingly, the degree of freedom in offset of the rear wheel suspension device is enhanced. In addition, since the rear wheel suspension device is mounted to the vehicle-body-side support member, which extends in the vehicle widthwise direction, by use of a fastening member such as a bolt from outside in the vehicle widthwise direction, the rear wheel suspension device can be firmly supported.

In the present invention, preferably, a main frame which forms a front half of the motorcycle frame structure includes a single backbone frame extending from a head pipe rearward and obliquely downward in the center portion in the vehicle widthwise direction, and the vehicle-body-side support member is supported by a rear portion of the backbone frame through a support base. According to this configuration, since a substantially intermediate portion, in the vehicle widthwise direction, of the vehicle-body-side support member which extends in the vehicle widthwise direction can be supported by the backbone frame, the rear wheel suspension device can be further strongly supported on the motorcycle frame structure.

In a case where the main frame includes the backbone frame, preferably, the support base has a substantially triangular shape in a side view, with one side thereof being connected to the backbone frame and an apex portion thereof having the vehicle-body-side support member mounted thereto. According to this configuration, since the support base has a simple triangular shape, the support base gives no complicatedness and presents a good appearance.

In a case where the main frame includes the backbone frame, preferably, the vehicle-body-side support member is positioned above the rear portion of the backbone frame, and front end portions of a pair of left and right seat rails are connected to the vehicle-body-side support member. According to this configuration, the vehicle-body-side support member can also be used for supporting the seat rails.

In a case where the front end portions of the seat rails are connected to the vehicle-body-side support member, preferably, the rear wheel suspension device is positioned below one of the seat rails. According to this configuration, the space below the seat rails can be effectively used.

In the present invention, preferably, the vehicle-body-side support member includes a pipe, and the mounting structure includes: a bolt which penetrates an insertion hole defined in the one end portion of the rear wheel suspension device and a hollow portion in the pipe; a collar inserted in a shank portion of the bolt; and a nut into which a tip portion of the bolt is threaded, in which case the one end portion of the rear wheel suspension device is rotatably supported at one end portion of the pipe by the bolt and the nut. According to this configuration, mounting of the rear wheel suspension device to the vehicle-body-side support member is easy.

In the present invention, preferably, the other end portion of the rear wheel suspension device is rotatably supported through a swingarm-side support member, at a position displaced to the one lateral side in the swingarm. According to this configuration, the rear wheel suspension device can be easily connected between the motorcycle frame structure and the swingarm, in an arrangement of being displaced to one lateral side of the vehicle body.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, preferred embodiments of the present invention will be described with reference to the drawings. The terms "left side" and "right side" used in this specification are the left side and the right side relative to a rider maneuvering a motorcycle.

Figure 1:
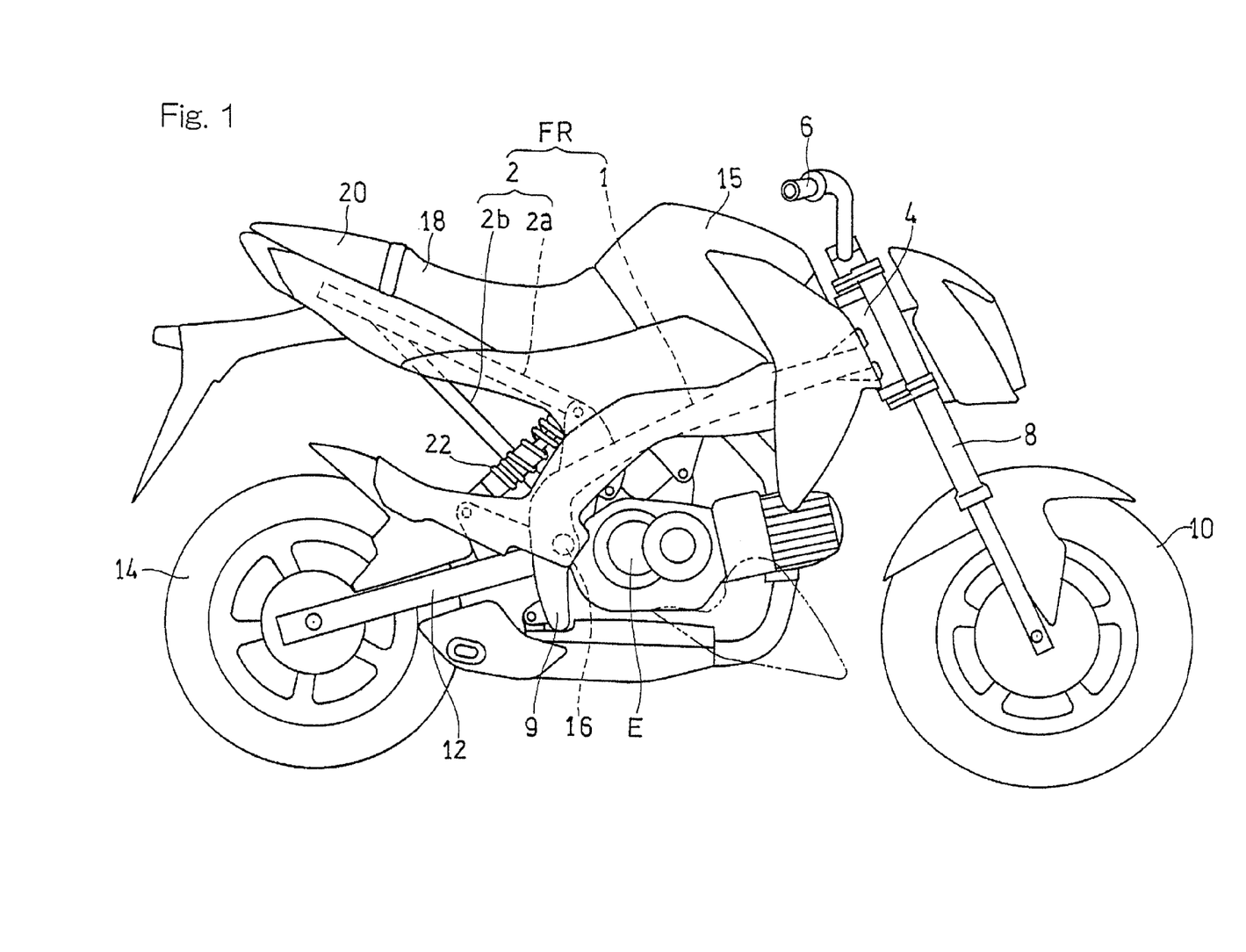
FIG. 1 is a side view showing a motorcycle equipped with a rear wheel suspension device mounting structure according to a first preferred embodiment of the present invention.

FIG. 1 is a side view of a motorcycle equipped with a rear wheel suspension device mounting structure according to a first preferred embodiment of the present invention. A motorcycle frame structure FR for this motorcycle includes: a main frame 1 which forms a front half of the motorcycle frame structure FR; and a rear frame 2 which forms a rear half of the motorcycle frame structure FR. The rear frame 2 includes: a pair of left and right seat rails 2a which extend rearward from a rear portion of the main frame 1; and a pair of left and right reinforcement pipes 2b which extend rearward and obliquely upward from the rear end of the main frame 1 and which are coupled to the seat rails 2a.

A head pipe 4 is provided at the front end of the main frame 1, and a front fork 8 is rotatably supported by the head pipe 4 via a steering shaft (not shown). A steering handle 6 is fixed to an upper end portion of the front fork 8, and a front wheel 10 is mounted to a lower end portion of the front fork 8.

A swingarm bracket 9 is provided at a rear end portion of the main frame 1. A swingarm 12 is supported for swing movement in a vertical direction about a pivot shaft 16 which is mounted to the swingarm bracket 9. A rear wheel 14 is rotatably supported by a rear end portion of the swingarm 12.

A combustion engine E is mounted to a lower intermediate portion of the motorcycle frame structure FR and at the front side of the swingarm bracket 9. The combustion engine E drives the rear wheel 14 through a drive chain (not shown). A fuel tank 15 is disposed above the main frame 1. A rider's seat 18 and a passenger's seat 20 are supported by the seat rails 2a rearward of the fuel tank 15.

Figure 3:
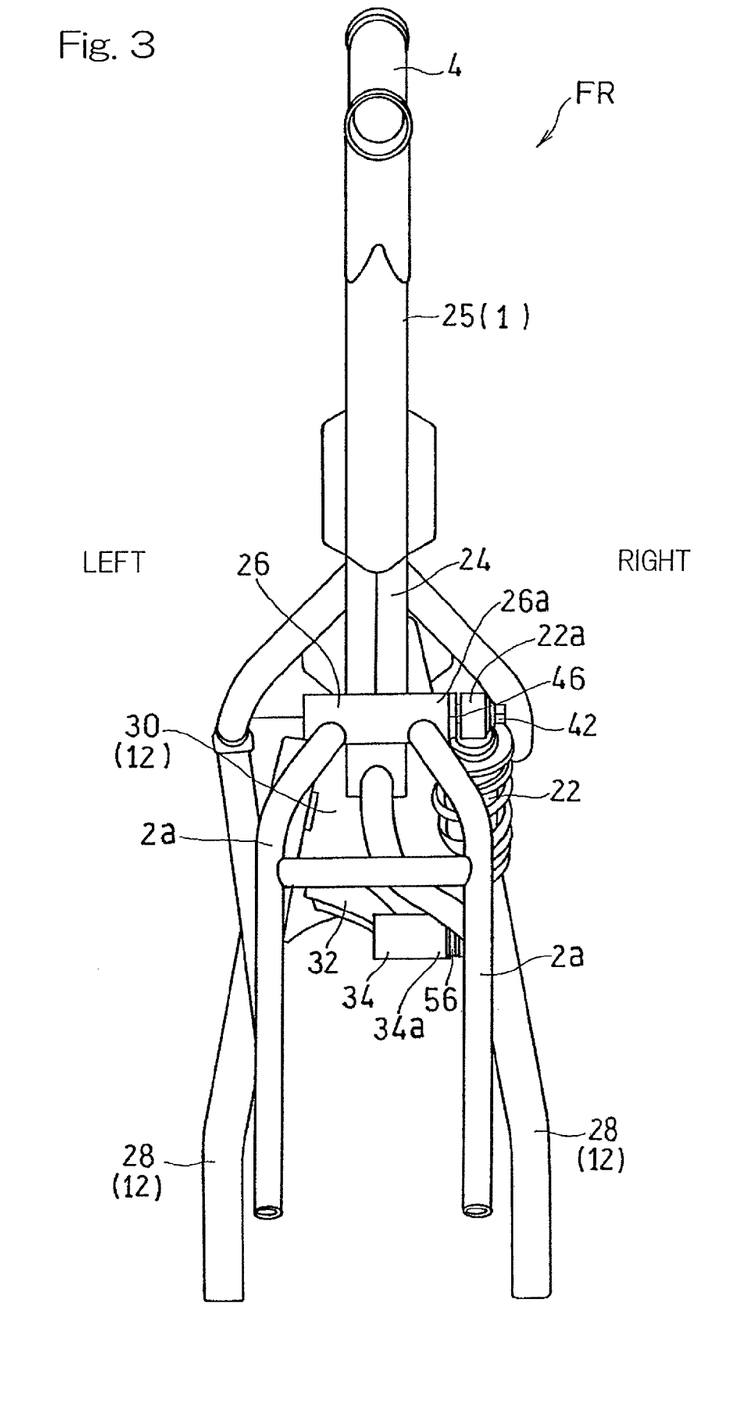
FIG. 3 is a plan view showing the motorcycle frame structure.

A rear wheel suspension device 22 which absorbs shock received from a road surface by the rear wheel 14 is suspended between the motorcycle frame structure FR and the swingarm 12. The rear wheel suspension device 22 of the present embodiment is a single-shock-type rear suspension which extends forward and obliquely upward. As shown in FIG. 3 which is a plan view of the motorcycle frame structure FR, the rear wheel suspension device 22 is disposed so as to be displaced to one lateral side relative to the center portion in the vehicle widthwise direction, and in the present embodiment, on the right side. Specifically, the rear wheel suspension device 22 is positioned below the right seat rail 2a.

Figure 2:
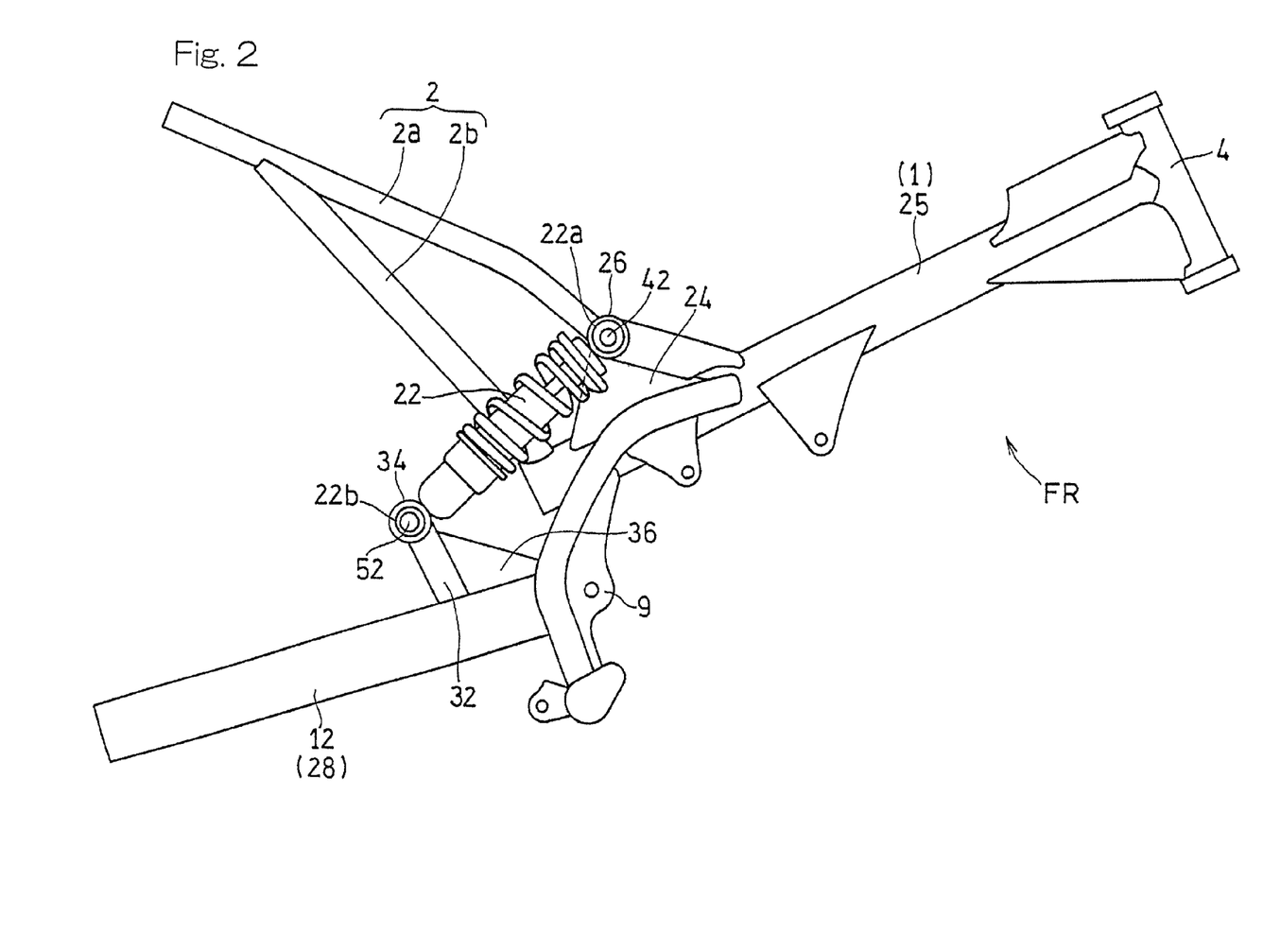
FIG. 2 is a side view showing a motorcycle frame structure of the motorcycle.

The main frame 1 includes a backbone frame 25 composed of a single cylindrical pipe which extends from the head pipe 4 rearward and obliquely downward in the center portion in the vehicle widthwise direction. As shown in FIG. 2 which is a right side view of the motorcycle frame structure FR, a support base 24 is fixed by welding to an upper part of a rear portion of the backbone frame 25.

Figure 4:
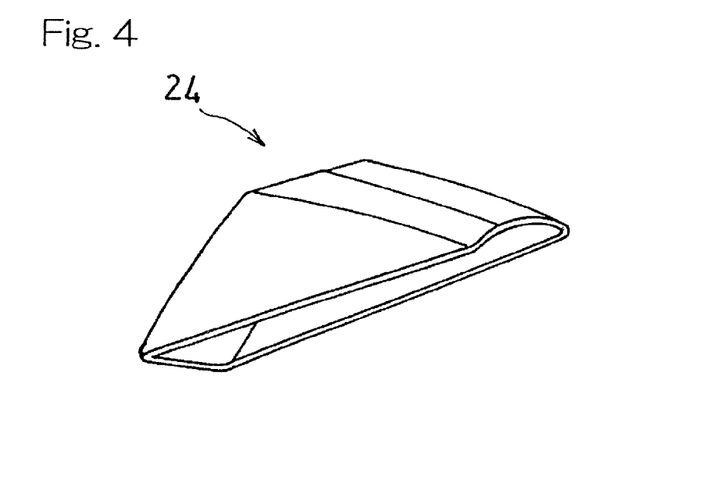
FIG. 4 is a perspective view showing a support base of the mounting structure.

As shown in FIG. 4, the support base 24 is formed by welding and joining a plurality of sheet metals that have been folded, and has, in the side view shown in FIG. 2, a substantially triangular shape which has the apex in an upper portion thereof. The base (lower side) of the support base 24 having this triangular shape is connected to the backbone frame 25. A vehicle-body-side support member 26 which extends in the vehicle widthwise direction is fixed by welding to the apex portion of the triangular support base 24. That is, the vehicle-body-side support member 26 is supported by the motorcycle frame structure FR through the support base 24.

The vehicle-body-side support member 26 is composed of a cylindrical pipe which extends in the vehicle widthwise direction, and is positioned above a rear portion of the backbone frame 25. Front end portions of the pair of left and right seat rails 2a are connected to the vehicle-body-side support member 26. The length in the vehicle widthwise direction of the vehicle-body-side support member 26 is substantially the same as the interval between the pair of left and right seat rails 2a. As shown in FIG. 3, a first nut 46 is mounted by welding to one end portion of the vehicle-body-side support member 26, and in the present embodiment, to a right end portion 26a. An upper end portion 22a which is one end portion of the rear wheel suspension device 22 is rotatably supported by the right end portion 26a of the vehicle-body-side support member 26. The mounting structure for the rear wheel suspension device 22 will be described later.

Figure 5:
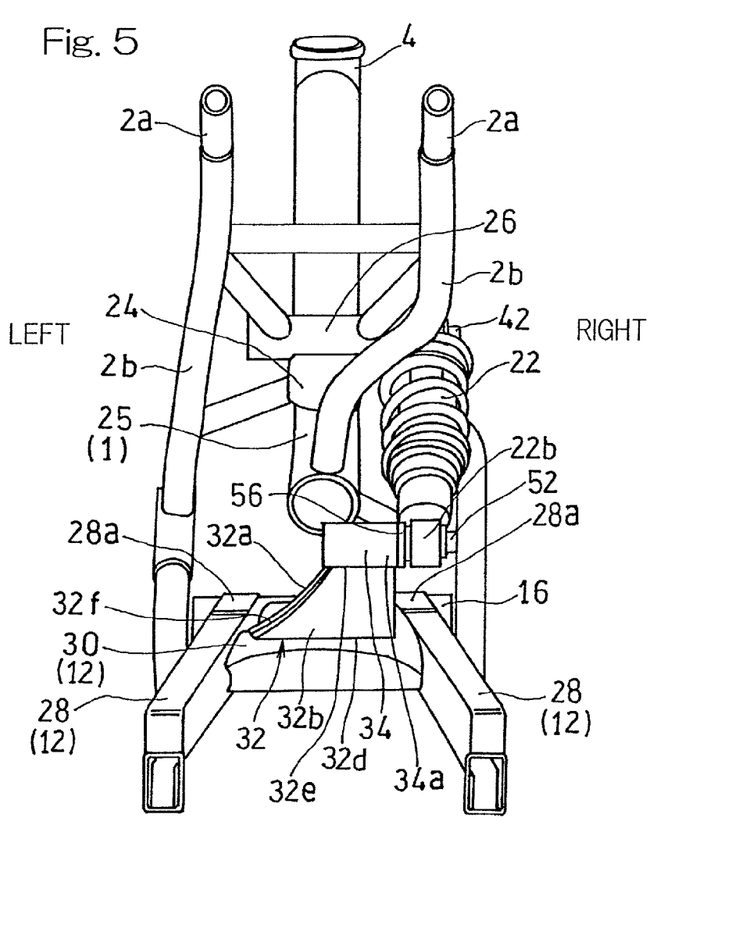
FIG. 5 is a rear view of the motorcycle frame structure.

FIG. 5 is a rear view of the motorcycle frame structure FR. As shown in FIG. 5, the swingarm 12 includes: a pair of left and right arm pieces 28 which extend in the front-rear direction or longitudinal direction; and a gusset 30 which couples front end portions 28a of the left and right arm pieces 28. Each arm piece 28 is composed of a pipe member whose cross section is a rectangle that is long in the vertical direction. This pipe member is straight. The front end portion 28a of each arm piece 28 is coupled by welding to the pivot shaft 16 which is composed of a cylindrical pipe.

Figure 6:
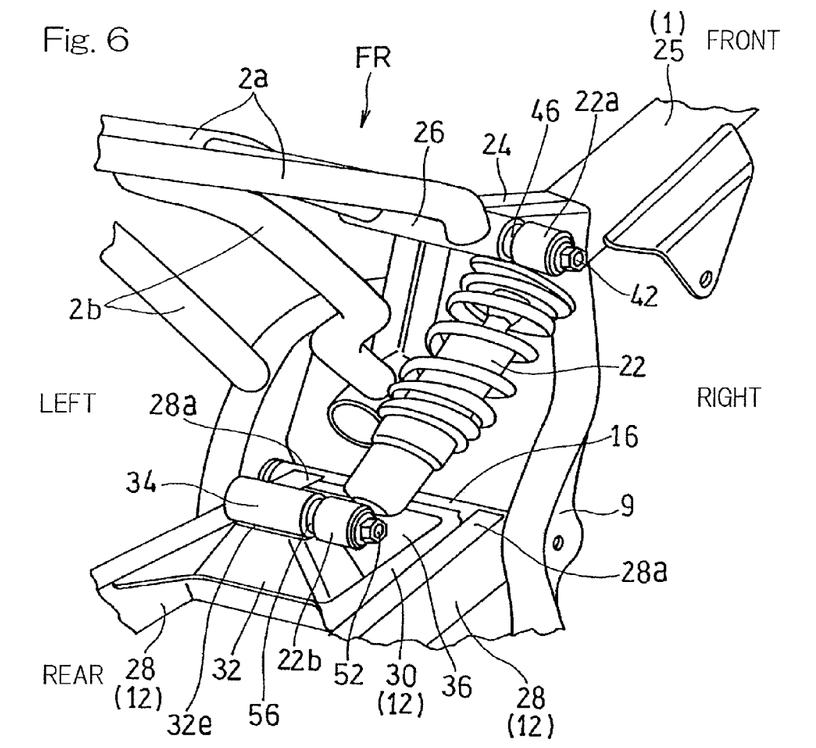
FIG. 6 is a perspective view of the motorcycle frame structure viewed from the rear and obliquely lateral side.

The gusset 30 is formed by bending a sheet metal. As explicitly shown in FIG. 6, the gusset 30 is disposed between the front end portions 28a of the left and right arm pieces 28, and is joined by welding to the pivot shaft 16 and the front end portions 28a of the arm pieces 28. In the present embodiment, the arm pieces 28 and the gusset 30 are joined together by welding, but the arm pieces 28 and the gusset 30 may be integrally formed by molding.

Figure 7:
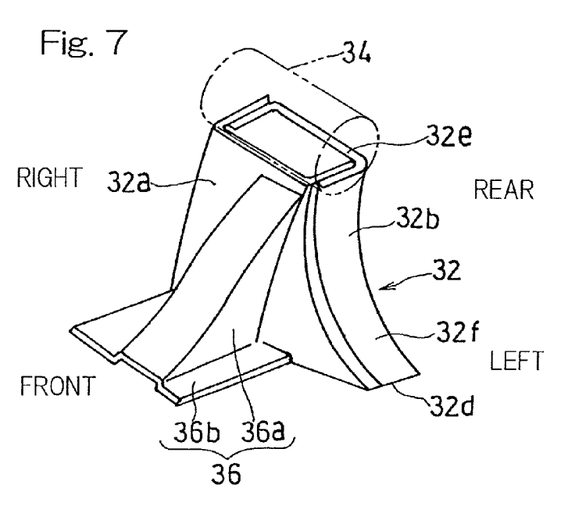
FIG. 7 is a perspective view showing a bracket of the mounting structure.

A bracket 32 protruding upward is provided to the gusset 30 of the swingarm 12, and is fixed by welding on the upper face of the gusset 30. As shown in FIG. 7, the bracket 32 has a two-part structure in which a front half body 32a and a rear half body 32b are welded and joined together, the front half body 32a and the rear half body 32b being two division parts each obtained by bending a sheet metal into a U-shape. The bracket 32 has, in the front view (rear view) shown in FIG. 5, a trapezoid shape whose lower base 32d is longer than an upper base 32e thereof, and in the present embodiment, a left side leg 32f has a curved shape so as to make a downwardly flaring shape of the trapezoid.

A swingarm-side support member 34 which extends in the vehicle widthwise direction is fixed by welding to the apex portion of the bracket 32. That is, the swingarm-side support member 34 is mounted to the swingarm 12 via the bracket 32. The swingarm-side support member 34 is composed of a cylindrical pipe, and the length thereof in vehicle widthwise direction is substantially the same as that of the upper base 32e of the bracket 32. By causing the bracket 32 to have such a trapezoid shape, the gusset 30 can be uniformly reinforced in the vehicle widthwise direction by the long lower base 32d, and the weight can reduced by making the upper base 32e short. A second nut 56 is mounted by welding to one end portion of the swingarm-side support member 34, and in the present embodiment, to a right end portion 34a. A lower end portion 22b of the rear wheel suspension device 22 is rotatably supported by the right end portion 34a of the swingarm-side support member 34. The mounting structure for the rear wheel suspension device 22 will be described later.

The gusset 30 of the swingarm 12 is provided with a reinforcement member 36 which protrudes upward and which has a substantially triangular shape in a side view. In detail, the reinforcement member 36 includes a reinforcement bottom plate 36b and a reinforcement body 36a having a triangular shape shown in FIG. 7 and being provided to the reinforcement bottom plate 36b so as to protrude upward therefrom, and the reinforcement bottom plate 36b is mounted by welding onto the gusset 30 of the swingarm 12. The reinforcement body 36a has one side (lower side) positioned on the reinforcement bottom plate 36b and another side (rear side) connected by welding to the front face of the bracket 32. In the present embodiment, the reinforcement member 36 is formed by bending a sheet metal.

The mounting structure for the rear wheel suspension device 22 will be described. First, with reference to FIG. 8, the mounting structure for the upper end portion 22a of the rear wheel suspension device 22 will be described. A cylindrical first collar 40 is inserted in a first insertion hole 38 defined in the upper end portion 22a of the rear wheel suspension device 22. The first collar 40 is a vibration-insulation-type collar in which a vibration insulation material 45 such as rubber is interposed between a metal inner tube 41 and a metal outer tube 43. Thereafter, from the right lateral side, a first bolt 42 is inserted through a first washer 44 and then a hollow portion 40a of the first collar 40, and then is fastened to the first nut 46 mounted to the right end portion 26a of the vehicle-body-side support member 26.

Figure 8:
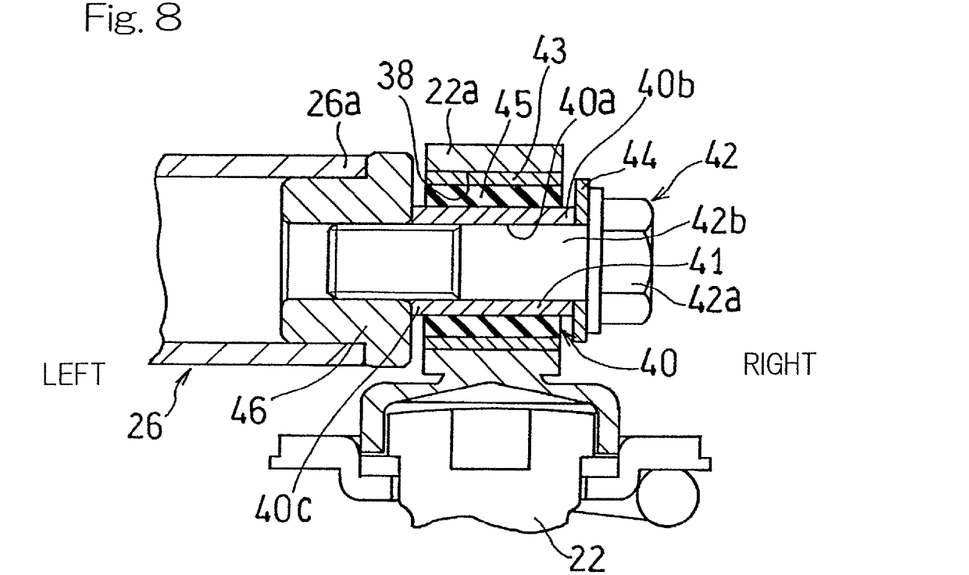
FIG. 8 is a cross-sectional view showing a mounting structure for an upper end portion of the rear wheel suspension device.

By so doing, a right end portion 40b of the inner tube 41 of the first collar 40 abuts against a head 42a of the first bolt 42 via the first washer 44, and a left end portion 40c of the inner tube 41 of the first collar 40 abuts against the first nut 46. That is, the first bolt 42 penetrates the insertion hole 38 in the upper end portion 22a of the rear wheel suspension device 22 and a part of the hollow portion of the pipe-shaped vehicle-body-side support member 26. The upper end portion 22a of the rear wheel suspension device 22 is rotatably supported by the first bolt 42, the first collar 40 inserted in a shank portion 42b of the first bolt 42, and the first nut 46 threaded into the tip portion of the first bolt 42.

Figure 9:
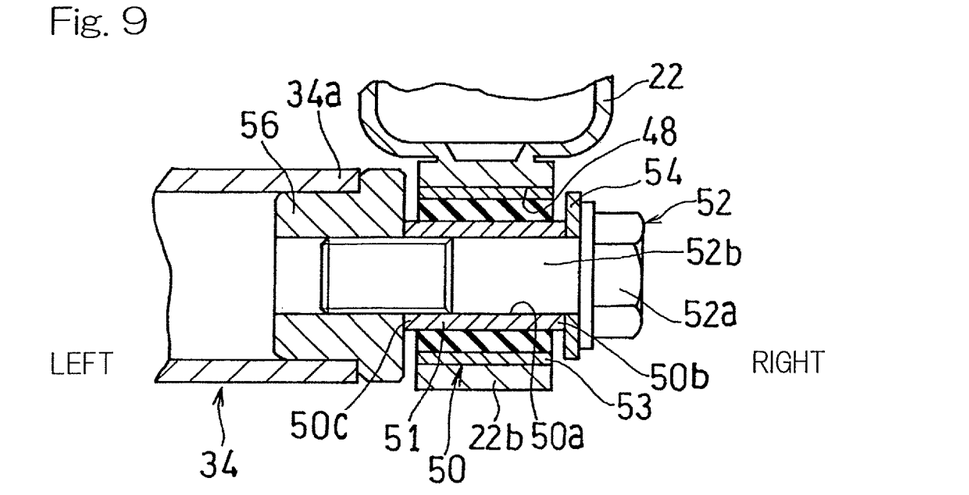
FIG. 9 is a cross-sectional view showing a mounting structure for a lower end portion of the rear wheel suspension device.

With reference to FIG. 9, the mounting structure for the lower end portion 22b of the rear wheel suspension device 22 will be described. The mounting structure for the lower end portion 22b of the rear wheel suspension device 22 is the same as the mounting structure for the upper end portion 22a (FIG. 8). That is, a vibration-insulation-type second collar 50 is inserted into a second insertion hole 48 defined in the lower end portion 22b of the rear wheel suspension device 22. Thereafter, from the right lateral side, a second bolt 52 is inserted through a second washer 54 and then a hollow portion 50a of the second collar 50, and then is fastened to the second nut 56 mounted to the right end portion 34a of the swingarm-side support member 34.

By so doing, a right end portion 50b of an inner tube 51 of the second collar 50 abuts against a head 52a of the second bolt 52 via the second washer 54, and a left end portion 50c of the inner tube 51 of the second collar 50 abuts against the second nut 56. That is, the second bolt 52 penetrates the insertion hole 48 in the lower end portion 22b of the rear wheel suspension device 22 and the hollow portion of the pipe-shaped swingarm-side support member 34. The lower end portion 22b of the rear wheel suspension device 22 is rotatably supported by the second bolt 52, the second collar 50 inserted in a shank portion 52b of the second bolt 52, and the second nut 56 threaded into the tip portion of the second bolt 52.

In FIGS. 8 and 9, the first and second nuts 46 and 56 are mounted to the right end portions 26a and 34a of the vehicle-body-side support member 26 and the swingarm-side support member 34, and the rear wheel suspension device 22 is supported by use of the first and second bolts 42 and 52. However, instead of this, bolts (screw bodies) that each protrudes toward the right lateral side are provided to the right end portions 26a and 34a of the vehicle-body-side support member 26 and the swingarm-side support member 34, and the bolts are inserted into the first and second insertion holes 38 and 48 of the upper and lower end portions 22a and 22b of the rear wheel suspension device 22, and nuts are fastened to those bolts from an outer lateral side, whereby the rear wheel suspension device 22 may be supported.

In the above configuration, the rear wheel suspension device 22 shown in FIG. 5 is disposed so as to be displaced from a longitudinal center line of the vehicle body to the right lateral side thereof. Thus, mounting and maintenance of the rear wheel suspension device 22 are facilitated, and in addition, a unique appearance can be obtained. Furthermore, the upper end portion 22a of the rear wheel suspension device 22 is rotatably supported by the right end portion 26a of the vehicle-body-side support member 26 which is provided to the main frame 1 and which extends in the vehicle widthwise direction. Meanwhile, the lower end portion 22b of the rear wheel suspension device 22 is rotatably supported by the right end portion 34a of the swingarm-side support member 34 which is provided to the swingarm 12 and which extends in the vehicle widthwise direction.

That is, the rear wheel suspension device 22 is supported in a cantilever manner by the right end portions 26a and 34a of the vehicle-body-side support member 26 and the swingarm-side support member 34 which each extends in the vehicle widthwise direction. Accordingly, the degree of freedom in offset of the rear wheel suspension device 22 is improved. In addition, the rear wheel suspension device 22 is mounted to the vehicle-body-side support member 26 and the swingarm-side support member 34, each extending in the vehicle widthwise direction, by use of the first and second bolts 42 and 52 from outside in the vehicle widthwise direction. Therefore, the rear wheel suspension device 22 can be easily connected between the main frame 1 and the swingarm 12, in an arrangement of being displaced to the right lateral side of the vehicle body, and the rear wheel suspension device 22 can be firmly supported.

The main frame 1 shown in FIG. 2 is composed of the single backbone frame 25 which extends rearward and obliquely downward from the head pipe 4 in the center portion in the vehicle widthwise direction, and the vehicle-body-side support member 26 is supported by a rear portion of the backbone frame 25 through the support base 24. Accordingly, the substantially intermediate portion in the vehicle widthwise direction of the vehicle-body-side support member 26 is supported by the backbone frame 25, and thus, the rear wheel suspension device 22 can be further firmly supported.

The support base 24 has a substantially triangular shape in a side view, and one side of this triangle is coupled onto the backbone frame 25, and the apex portion of the triangle has the vehicle-body-side support member 26 mounted thereto. Thus, since the support base 24 has a simple triangular shape, there is no complicatedness in the support base 24 and appearance is rendered to be good.

The vehicle-body-side support member 26 is positioned above the rear portion of the backbone frame 25, and the front end portions of the pair of the left and right seat rails 2a are connected to the vehicle-body-side support member 26. By using the vehicle-body-side support member 26 concurrently for supporting the seat rails 2a, the number of components can be reduced. In addition, since the rear wheel suspension device 22 is positioned below the right seat rail 2a, the space below the seat rail 2a can be effectively used.

As shown in FIG. 8, the upper end portion 22a of the rear wheel suspension device 22 is rotatably supported by: the first bolt 42 which penetrates the insertion hole 38 in the upper end portion 22a of the rear wheel suspension device 22 and the hollow portion of the vehicle-body-side support member 26; the first collar 40 inserted in the shank portion 42b of the first bolt 42; and the first nut 46 threaded into the tip portion of the first bolt 42. Accordingly, mounting of the rear wheel suspension device 22 to the vehicle-body-side support member 26 is easy.

The swingarm-side support member 34 is mounted to the gusset 30 of the swingarm 12 shown in FIG. 5. Accordingly, even when the arm pieces 28 are composed of light-weight pipe members, the swingarm-side support member 34 can be supported by the gusset 30 having high strength.

The swingarm-side support member 34 is mounted to the apex portion of the bracket 32 which protrudes upward from the gusset 30 of the swingarm 12. Accordingly, the degree of freedom in arrangement of the swingarm-side support member 34 is enhanced, and thus, the degree of freedom of arrangement of the rear wheel suspension device 22 is also enhanced.

The reinforcement member 36 having a substantially triangular shape in a side view is provided to the gusset 30, and one side of the reinforcement member 36 having the triangular shape is connected onto the gusset 30 of the swingarm 12, and another side thereof is connected to the bracket 32. By this reinforcement member 36, the rear wheel suspension device 22 is stably supported. Further, by providing the reinforcement member 36 to the gusset 30, the rigidity of the gusset 30 is increased, and therefore, the supporting strength for the swingarm-side support member 34 which is mounted to the gusset 30 is also increased. As a result, the lower end portion 22b of the rear wheel suspension device 22 can be further stably supported.

As shown in FIG. 9, the lower end portion 22b of the rear wheel suspension device 22 is rotatably supported by: the second bolt 52 which penetrates the insertion hole 48 in the lower end portion 22b of the rear wheel suspension device 22 and the hollow portion of the swingarm-side support member 34; the second collar 50 inserted in the shank portion 52b of the second bolt 52; and the second nut 56 into which the tip portion of the second bolt 52 is threaded. Accordingly, mounting of the rear wheel suspension device 22 to the swingarm-side support member 34 is easy.

The present invention is not limited to the above-described embodiment, and various additions, changes, deletions can be made without departing from the gist of the present invention. For example, in the above embodiment, the motorcycle frame structure FR equipped with the main frame 1 composed of the single backbone frame 25 has been described. However, the structure of the motorcycle frame structure FR is not limited thereto. In addition, the position and shape of the support base 24 is not limited to those described in the embodiment. Further, the rear wheel suspension device 22 may be disposed so as to be offset to the left lateral side of the vehicle body.

In the above embodiment, the vehicle-body-side support member 26 and the swingarm-side support member 34 are each formed by a cylindrical pipe. However, it is sufficient that the vehicle-body-side support member 26 and the swingarm-side support member 34 are each a member that extends in the vehicle widthwise direction, and are not limited to a cylindrical pipe. Further, the position and shape of the bracket 32 is not limited to those described in the embodiment. For example, the bracket 32 may be provided to an arm piece 28 instead of the gusset 30. Thus, such configurations are included in the scope of the present invention.

REFERENCE NUMERALS 1 main frame
2a seat rail 4 head pipe
12 swingarm
22 rear wheel suspension device
24 support base
25 backbone frame
26 vehicle-body-side support member
34 swingarm-side support member
38 first insertion hole (insertion hole)
40 first collar (collar)
42 first bolt (bolt)
46 first nut (nut)
FR motorcycle frame structure

What is claimed is:

1. A rear wheel suspension device mounting structure of a motorcycle frame structure, in which a rear wheel suspension device of a motorcycle is disposed so as to be displaced to one lateral side relative to a center portion in a vehicle widthwise direction of the motorcycle comprising;
   a main frame which forms a front half of the motorcycle frame structure and includes a single backbone frame extending from a head pipe rearward and obliquely downward in the center portion in the vehicle widthwise direction, and
   a vehicle-body-side support member supported by a rear portion of the backbone frame through a support base, wherein;
   the rear wheel suspension device mounting structure includes the vehicle-body-side support member provided in the motorcycle frame structure and extending in the vehicle widthwise direction of the motorcycle; and
   one end portion of the rear wheel suspension device is rotatably supported by one end portion of the vehicle-body-side support member.

2. The rear wheel suspension device mounting structure of the motorcycle frame structure as claimed in claim 1, wherein
   the support base has a substantially triangular shape in a side view, with one side thereof being connected to the backbone frame and an apex portion thereof having the vehicle-body-side support member mounted thereto.

3. The rear wheel suspension device mounting structure of the motorcycle frame structure as claimed in claim 1, wherein
   the vehicle-body-side support member is positioned above the rear portion of the backbone frame, and front end portions of a pair of left and right seat rails are connected to the vehicle-body-side support member.

4. The rear wheel suspension device mounting structure of the motorcycle frame structure as claimed in claim 3, wherein
   the rear wheel suspension device is positioned below one of the seat rails.

5. The rear wheel suspension device mounting structure of the motorcycle frame structure as claimed in claim 1, wherein the vehicle-body-side support member includes a pipe;
   a bolt which penetrates an insertion hole defined in the one end portion of the rear wheel suspension device and .a hollow portion in the pipe;
   a collar inserted in a shank portion of the bolt; and
   a nut into which a tip portion of the bolt is threaded, wherein
   the one end portion of the rear wheel suspension device is rotatably supported at one end portion of the pipe by the bolt and nut.

6. The rear wheel suspension device mounting structure of the motorcycle frame structure as claimed in claim 1, wherein
   the other end portion of the rear wheel suspension device is rotatably supported through a swingarm-side support member, at a position displaced to the one lateral side in the swingarm.

7. The rear wheel suspension device mounting structure of the motorcycle frame structure as claimed in claim 6, wherein
   the rear wheel suspension device absorbs shock received from a rear wheel and is suspended between the motorcycle frame structure and the swingarm.

* * * * *